United States Patent
Phillips

(10) Patent No.: US 11,326,795 B2
(45) Date of Patent: May 10, 2022

(54) AIR CONDITIONING SYSTEM WITH REDUCED MOULD GROWTH CONDITIONS

(71) Applicant: SMAC Technologies Pty Ltd, Kent Town (AU)

(72) Inventor: Peter George Phillips, Carrick (AU)

(73) Assignee: SMAC Technologies Pty Ltd, Kent Town (AU)

( * ) Notice: Subject to any disclaimer, the term of this patent is extended or adjusted under 35 U.S.C. 154(b) by 67 days.

(21) Appl. No.: 16/606,946

(22) PCT Filed: Apr. 19, 2018

(86) PCT No.: PCT/AU2018/050350
§ 371 (c)(1),
(2) Date: Oct. 21, 2019

(87) PCT Pub. No.: WO2018/191781
PCT Pub. Date: Oct. 25, 2018

(65) Prior Publication Data
US 2020/0191422 A1    Jun. 18, 2020

(30) Foreign Application Priority Data
Apr. 21, 2017 (AU) ................................ 2017901470

(51) Int. Cl.
*F24F 11/00* (2018.01)
*F24F 11/74* (2018.01)
(Continued)

(52) U.S. Cl.
CPC .......... *F24F 11/0008* (2013.01); *F24F 3/001* (2013.01); *F24F 3/14* (2013.01); *F24F 11/74* (2018.01); *F24F 2110/22* (2018.01)

(58) Field of Classification Search
CPC .......... F24F 3/14; F24F 3/147; F24F 11/0008; F24F 2110/22
See application file for complete search history.

(56) References Cited

U.S. PATENT DOCUMENTS 4,834,285 A * 5/1989 Besik ..................... F24F 3/1411
126/110 C
5,309,725 A * 5/1994 Cayce ..................... F24F 3/153
62/90

(Continued)

FOREIGN PATENT DOCUMENTS

CN    101484757 B    10/2011
CN    205747186 U    11/2016
(Continued)

OTHER PUBLICATIONS

International Search Report; PCT Application No. PCT/AU2018/050350; dated Aug. 20, 2018.
(Continued)

*Primary Examiner* — Nelson J Nieves
(74) *Attorney, Agent, or Firm* — Polsinelli PC

(57) ABSTRACT

An air conditioning system includes an outdoor air latent cooling treatment stage providing parallel airflow with a return air sensible cooling treatment stage. A mixer mixes the treated outdoor air with the return air to form the conditioned space supply air. A first relative humidity controller monitors the outdoor air relative humidity and separates the outdoor air from saturation to maintain relative humidity in outdoor air ducting below a predetermined mould growth limit. A second relative humidity controller monitors the conditioned space supply air relative humidity and separates the space supply air from saturation to maintain relative humidity in space supply air ducting below a predetermined mould growth limit. The outdoor air latent cooling treatment stage includes a dehumidification heat exchanger, combination pre-cooling and heat reclaim heat exchangers, or a heat transfer pump. The return air sensible cooling treatment stage includes at least a sensible cooling heat exchanger.

9 Claims, 3 Drawing Sheets

(51) Int. Cl.
  *F24F 3/00* (2006.01)
  *F24F 3/14* (2006.01)
  *F24F 110/22* (2018.01)

(56) References Cited

U.S. PATENT DOCUMENTS

| | | | | |
|---|---|---|---|---|
| 5,400,607 | A * | 3/1995 | Cayce | G05D 27/02 |
| | | | | 62/90 |
| 5,802,862 | A * | 9/1998 | Eiermann | F24F 3/14 |
| | | | | 165/228 |
| 6,269,650 | B1 * | 8/2001 | Shaw | F24F 11/83 |
| | | | | 62/176.6 |
| 10,126,005 | B1 * | 11/2018 | Carson, Sr. | G05D 23/1927 |
| 2010/0065650 | A1 | 3/2010 | Phillips | |
| 2011/0306288 | A1 * | 12/2011 | Murayama | F24F 11/0008 |
| | | | | 454/184 |
| 2013/0013117 | A1 * | 1/2013 | Desrochers | F24F 7/08 |
| | | | | 700/276 |
| 2013/0299157 | A1 * | 11/2013 | Murayama | H05K 7/20745 |
| | | | | 165/224 |
| 2016/0252262 | A1 * | 9/2016 | Mariotto | F24F 11/83 |
| | | | | 62/90 |
| 2019/0195524 | A1 * | 6/2019 | Carter | F24F 11/74 |

FOREIGN PATENT DOCUMENTS

| | | |
|---|---|---|
| DE | 10027467 A1 | 12/2001 |
| WO | 20160333633 A1 | 3/2016 |

OTHER PUBLICATIONS

Written Opinion of PCT Application No. PCT/AU2018/050350; dated Aug. 20, 2018.
English Language Abstract of DE10027467 Obtained on Feb. 26, 2017.
Second Chinese Office Action; CN Application No. 201880034196.2, dated Jul. 19, 2021, 4 pages.
English Translation of Second Chinese Office Action; CN Application No. 201880034196.2, dated Jul. 19, 2021, 6 pages.

\* cited by examiner

AIR CONDITIONING SYSTEM WITH REDUCED MOULD GROWTH CONDITIONS

CROSS-REFERENCE TO RELATED APPLICATIONS

This application is a national stage entry of PCT/AU2018/050350 filed Apr. 19, 2018, which claims convention priority from Australian provisional patent application 2017901470 filed on 21 Apr. 2017, the contents each of which are hereby incorporated by reference in their entirety.

FIELD OF THE INVENTION

The present invention relates to an improved air conditioning system, including a method and apparatus for controlling the improved air conditioning system, which provides conditions suitable for reducing or minimizing the amount of mould growth that might normally occur in air conditioning systems, particularly air conditioning systems that operate in areas of high humidity.

BACKGROUND OF THE INVENTION

Conventional air conditioning design theories were challenged in the 1990's by a series of innovative thoughts developed by the late Dr Allan Shaw. These thoughts culminated with the air conditioning control system described in Dr Shaw's U.S. Pat. No. 6,269,650. This patent, and the system it describes, is now owned by the present applicant and will be referred to throughout this specification as the "Shaw system".

The Shaw system is a system that operates air conditioning functions in parallel to separate the process of treating latent loads (typically to remove moisture from outdoor air) and sensible loads (typically internal air which is drier). The Shaw system differs from conventional air conditioning processes in that, rather than introducing untreated outdoor air and then cooling it within the total air conditioning system, incoming outdoor air is pre-treated (dehumidified and cooled) by a first, separate outdoor-air heat exchanger before being merged with typically drier (treated or untreated) inside air that generally has been cooled. The two air streams are merged, to then be delivered to the conditioned space.

The Shaw system is a twin heat exchanger system that provides the additional benefit of permitting the passage of the same cooling medium stream (typically water) through both heat exchangers, preferably in series, to maximize efficiency. This twin heat exchanger process also avoids the traditional need for high energy inputs on two levels, firstly to overcool and then to re-heat air in order to maintain a desired level of humidity in a conditioned space. Coupled with a control system that permits integrated control of humidity, temperature and chiller operation, it has proven to be possible for the air treatment processes of the Shaw system to optimize energy performance at all times in the operating cycle to provide significantly reduced energy consumption and accurate control over humidity and temperature fluctuations in a conditioned space.

As the Shaw system typically finds use in regions of high humidity, the Shaw system (like any other air conditioning system) is subject to the normal health concerns associated with mould growth within different parts of the system. In this respect, microbes abound in the natural environment and are normally present in low concentration level throughout buildings. Buildings and building systems are not sterile and will always contain some microbes. Generally, health hazards which can lead to infections such as Legionnaires' disease or pontiac fever, or allergic reactions such as humidifier fever, are created only when these microbes multiply to high concentrations.

The three main categories of microbes that can be found in building environments are viruses, fungi and bacteria. Viruses are the simplest form of microorganism (microbe) but they can only reproduce within other living cells. The sources for viral transmission are the occupants rather than the building services. On the other hand, fungi and bacteria can colonize in building services if moisture and organic nutrients are present. Fungi (e.g. mould) attach to hard surfaces and are readily able to grow in conditions of high humidity as they extract their moisture from the air. Fortunately, they can be controlled by normal principles of hygiene, such as keeping surfaces dry, and by regular cleaning and disinfection with a mild bleaching agent. While fungi are difficult to eliminate, they will germinate only when moisture returns.

The American Society of Heating, Refrigerating and Air-Conditioning Engineers (ASHRAE) in its 2013 Fundamentals handbook summarises the problem of mould growth in the following manner. Mould can grow on most surfaces if the relative humidity at the surface is above a critical value, if the surface temperature is conducive to growth, and if the substrate provides nutritional value to the organism. The growth rate depends on the magnitude and duration of the surface relative humidity.

Surface relative humidity is a complex function of moisture content, local surface temperature, and humidity conditions in the relevant space. In recognition of the issue's complexity, the International Energy Agency (IEA) established a surface relative humidity criterion for design purposes, which is that monthly average values of surface relative humidity should remain below 80% in order to avoid undesirable mould growth in air conditioning equipment. Other proposals include the Canada Mortgage and Housing Corporation's more stringent requirement to always keep surface relative humidity below 65% in air conditioning equipment. Although there is still no international agreement on which criterion is most appropriate, mould growth can usually be avoided by allowing surface relative humidity over 80% only for short time periods. Further, the surface relative humidity criterion may be relaxed for nonporous surfaces that are regularly cleaned.

Additionally, most moulds only grow at temperatures above 5° C., and moisture accumulation below 5° C. may not result in mould growth if the material is allowed to dry out below the hygroscopic moisture content for a relative humidity of 80%, before the temperature rises above 5° C.

With this in mind, it is therefore desirable to design air conditioning systems which can avoid generating internal conditions (such as conditions within ducting) that are conducive to mould growth within air conditioning equipment, and thereby maintain conditions which are unlikely to transfer microbial health risks from air conditioning equipment to a conditioned space. In this respect, examples of air conditioning equipment that might only be intermittently moist, but which is able to support mould growth, includes cooling coils, condensate trays, drain lines, ducting near cooling coils (and ducting in general), and humidifier surfaces.

Before turning to a summary of the present invention, it must be appreciated that the above description of the prior art has been provided merely as background to explain the context of the invention. It is not to be taken as an admission that any of the material referred to was published or known, or was a part of the common general knowledge in Australia or elsewhere.

SUMMARY OF THE INVENTION

The present invention provides an air conditioning system that is capable of treating a conditioned space by treating outdoor air from outside the conditioned space and return air from inside the conditioned space, and mixing the treated outdoor air with the treated return air to form supply air for the conditioned space, the air conditioning system including:

- an outdoor air latent cooling treatment stage configured to provide parallel airflow with a return air sensible cooling treatment stage;
- a mixer for mixing the treated outdoor air with the treated return air to form the conditioned space supply air;
- a first relative humidity controller capable of monitoring the treated outdoor air relative humidity and separating the treated outdoor air from saturation to maintain relative humidity in treated outdoor air ducting below a predetermined mould growth limit; and
- a second relative humidity controller capable of monitoring the conditioned space supply air relative humidity and separating the conditioned space supply air from saturation to maintain relative humidity in conditioned space supply air ducting below a predetermined mould growth limit;

wherein the outdoor air latent cooling treatment stage includes at least a dehumidification heat exchanger, combination pre-cooling and heat reclaim heat exchangers, and a heat transfer pump, and the return air sensible cooling treatment stage includes at least a sensible cooling heat exchanger.

The reference to "parallel airflow" above, and throughout this specification, is to be understood to mean that the two treatment stages are configured so that the latent cooling is conducted upon the outdoor air prior to it being mixed with treated return air (treated in the sense of the return air having undergone sensible cooling)—it does not similarly require that the sensible cooling be conducted upon the return air prior to it being mixed with treated outdoor air. The reference to "parallel" is also of course not to be read as a geometric limitation related to the physical location or arrangement of any equipment utilised in the system of the present invention.

The heat exchange medium for the sensible cooling heat exchanger is ideally passed in series with the dehumidification heat exchanger. The series configuration reduces the temperature difference, which increases flow rate through the dehumidification heat exchanger, thereby improving the heat exchange efficiency and its effectiveness to operate at a higher apparatus dew point to enable a chiller to operate at a higher saturated suction temperature. The second phase of the series circuit, namely the sensible cooling heat exchanger, then preferably utilizes the remaining cooling impetus. Additionally, the reduced temperature difference increases flow rate through the sensible cooling heat exchanger, thereby improving heat exchanger efficiency and its effectiveness to operate at a high temperature.

The air conditioning system of the present invention also preferably includes a demand driven primary heat exchange medium set point and a demand driven secondary heat exchange flow rate. In this respect, it will be appreciated that the energy required to generate a cooling medium at a lower saturated suction temperature is higher than the energy that is required to generate a cooling medium at a higher saturated suction temperature. Elevation of the saturated suction temperature through demand from heat exchangers operating at higher efficiency permits the cooling medium saturated suction temperature to be raised, thereby reducing the energy required to generate the cooling effect.

As mentioned above, the outdoor air latent cooling treatment stage includes, amongst other things, combination pre-cooling and heat reclaim heat exchangers. The reference to "combination" pre-cooling and heat reclaim heat exchangers is a reference to the matching of the amount of heat transfer from the pre-cooling heat exchanger to the heat reclaim heat exchanger. Indeed, both heat exchangers are dependent on each other through the heat exchange fluid. Also, the heat exchange fluid cooled by the heat reclaim heat exchanger is transferred to the pre-cooling heat exchanger, which then utilises the cooled heat exchange fluid to pre-cool the air stream. Ideally, the warmed heat exchange fluid then returns to the heat reclaim heat exchanger to again be cooled. In this respect, the flow process is complimentary and regulated by demand.

The outdoor air latent cooling treatment stage thus includes one heat exchanger for dehumidification cooling and two heat exchangers for heat reclaim in order to provide separation from the saturation curve, without supplemental reheat, and thereby to provide energy improvements. In particular, the outdoor air latent cooling treatment stage therefore preferably includes a heat reclaim pre-cooling heat exchanger, a chilled water dehumidification heat exchanger, and a further heat reclaim heat exchanger. In this form, the first stage of cooling is provided by the (overcool energy shift) heat reclaim pre-cooling heat exchanger.

The energy required for dehumidification also preferably sensibly cools the outdoor air stream. This energy is ideally shifted by use of a closed heat reclaim loop to pre-cool the dehumidification air stream, such that the energy that is used to dehumidify the outdoor air stream can be reclaimed by the heat reclaim heat exchanger. This heat exchanger is preferably connected by a heat reclaim water loop that is filled by a connection to a chilled water system, and the energy is shifted by a pump to the heat reclaim pre-cooling heat exchanger.

In this respect, the amount of energy shifted will generally be determined by either the conditioned space sensible heat load requirement or the maximum relative humidity requirement of the treated outdoor air leaving the combination heat exchangers, and the rate at which the energy is shifted will generally dictate the separation temperature differential from the saturation curve, thereby providing a variable sensible heat ratio, or a treated outdoor air relative humidity condition, that would otherwise be achieved by reheating by an additional heat source. When energy recovered (shifted) by the heat re-claim process is insufficient to achieve either the conditioned space dry bulb temperature or the treated outdoor air maximum relative humidity condition, an additional sensible heating heat exchanger would be incorporated in the outdoor air latent cooling treatment stage.

In the system of the present invention, a chilled water heat exchanger can provide sensible cooling for the conditioned space that cannot otherwise be provided by an outdoor air dehumidified stream delivered separated from the saturation curve. Such a chilled water heat exchanger is preferably connected in series to the chilled water dehumidification heat exchanger of the outdoor air latent cooling treatment stage.

Where a sensible heating heat exchanger is incorporated in the outdoor air latent cooling treatment stage, use of a low energy resource should be utilised, such as condenser water from the chiller cooling process. A heating water heat exchanger can then provide additional heating capacity if the condenser water system cannot provide sufficient conditioned space heating.

As mentioned above, the return air sensible cooling treatment stage includes at least a sensible cooling heat exchanger. However, where latent cooling demands from the conditioned space require the return air sensible cooling treatment stage to also provide latent cooling, then combination pre-cooling and heat reclaim heat exchangers may be added to the sensible cooling heat exchanger in a similar manner as with the outdoor air latent cooling treatment stage.

Also, in a system where there is minimal or no ducting between the outdoor air dehumidification heat exchangers and the mixing of treated outdoor air with treated return air, a single heat reclaim heat exchanger (and where necessary a single sensible heating heat exchanger) may be provided in the conditioned space supply air stream to shift the dehumidification process sensible cooling over burden to enhance the outdoor air pre-cooling process.

Of course, following the above described separate treatment of the outdoor air and the return air, the two air streams are preferably mixed to provide a single supply air stream to be delivered to the space to be conditioned.

Returning now to a general description of various improved aspects of the air conditioning system of the present invention, as mentioned above the air conditioning system of the present invention includes a first relative humidity controller capable of monitoring the treated outdoor air relative humidity, preferably by way of an outdoor air stream relative humidity input device that measures the outdoor air stream relative humidity and in a preferred form provides it as an input to an outdoor air stream relative humidity management system.

Additionally, an outdoor air stream dry bulb temperature input device can also be provided that measures the outdoor air stream dry bulb temperature, and in a preferred form also provides it as an input to the outdoor air stream relative humidity management system.

In this preferred form, it is this management system that separates the outdoor air stream dry bulb temperature from the saturation curve to limit relative humidity within the outdoor air stream ducting.

In this respect, this separation from the saturation curve may be provided in several ways, but in a preferred form is provided by the shifting of sensible heating energy from the warmer, untreated outdoor air dry bulb condition to the dehumidified condition, increasing the outdoor air stream's dry bulb temperature and thereby decreasing the relative humidity of the dehumidified condition of the outdoor air stream.

The preferred amount of energy shifted within the dehumidification process from the heat reclaim heat exchanger to the pre-cooling heat exchanger will be determined by the rate of mass flow within this heat transfer circuit. In this respect, the mass flow of the heat exchange medium may be varied in response to demand from the conditioned space sensible heating requirements, the treated outdoor air ducting relative humidity set point, or the conditioned space supply air relative humidity set point. The greatest demand for heat shifting will result in the warmest/driest air condition necessary from the dehumidification process to satisfy all control parameters. It will be appreciated that these warm/dry conditions will reduce the propensity for the proliferation of mould colonization in the various ducting sections.

The relative humidity set point in the outdoor air stream relative humidity management system, for the control of mould colonization, may be determined on a jurisdictional (such as national or state) basis, or potentially simply on a regional or building basis, such as with reference to the same sources identified above in the Background section of this patent specification. The set point may be lowered depending on the physical separation distance between the treatment stages and the point of delivery to either the air mixer or the conditioned space. Also, a greater expanse of surface area within the interconnecting ducting system connecting the treatment stages and the conditioned space may further drive a requirement to convey drier air (and thus a further lowering of the set point) to reduce risk. It thus should be appreciated that the set point can be any predetermined set point, and that this patent specification does not purport to describe or claim a specific set point or range of set points, and then portray it to be a set point that will be suitable for all systems in all environments.

The air conditioning system of the present invention also includes a second relative humidity controller, this time capable of monitoring the conditioned space supply air relative humidity, preferably by way of a conditioned space supply air stream relative humidity input device that measures the conditioned space supply air stream relative humidity and in a preferred form provides it as an input to a conditioned space supply air stream relative humidity management system.

Additionally, a conditioned space supply air stream dry bulb temperature input device can also be provided that measures the conditioned space supply air stream dry bulb temperature, and in a preferred form provides it as an input also to the conditioned space supply air stream relative humidity management system.

In this preferred form, it is this management system that separates the conditioned space supply air stream dry bulb temperature from the saturation curve to limit relative humidity within the conditioned space supply air stream ducting.

In this respect, this separation from the saturation curve may be provided in several ways, but in preferred forms is provided by increasing mass flow within either or both the outdoor air pre-cooling and heat reclaim heat exchangers heat transfer circuit, and the return air pre-cooling and heat reclaim heat exchangers heat transfer circuit (where incorporated) and finally, where necessary, by altering the conditioned space set points, either dry bulb or relative humidity or both.

In this respect, the amount of energy shifted within the dehumidification process from the outdoor air and/or the return air pre-cooling heat exchangers to the heat reclaim heat exchanger may again be determined by the rate of mass flow within these heat transfer circuits. The mass flow of the heat exchange medium may be varied in response to demand from either the conditioned space sensible heating requirements or the conditioned space supply air relative humidity set point. The greatest demand for heat shifting will result in the warmest treated air condition necessary. This warm/dry condition will reduce the propensity for the proliferation of mould colonization within the conditioned space supply air ducting system. The relative humidity set point for control of mould colonization may again (as explained above) be determined with reference to local, regional, state or national requirements, and again this set point may be lowered depending on the physical separation distance between the treatment stages and the point of delivery to the conditioned space, or by there being a greater expanse of surface area within the interconnecting supply air ducting system connecting the treatment stages and the conditioned space.

In conjunction with, but subsequent to, this heat shifting within the outdoor air latent cooling treatment stage, and where incorporated within the return air sensible cooling treatment stage, the conditioned space dry bulb temperature set point and the conditioned space relative humidity set point (either relative or absolute) thus may both be adjusted to increase the dry bulb temperature differential from the saturation curve. This adjustment beneficially shifts the responsibility for creation of a conditioned space comfort scenario (toward set point satisfaction) being achieved by means of the outdoor air treatment stage in preference to the return air treatment stage, thereby providing an improved potential to achieve separation from saturation within the conditioned space supply air ducting.

Where heat shifting is only incorporated into the outdoor air treatment stage there is potentially two separate ducting system relative humidity set points. Where this occurs, heat transfer may be regulated to satisfy both the treated outdoor air ducting relative humidity set point and the conditioned space supply air ducting relative humidity set point, whichever demands the greater heat shifting within the outdoor air treatment stage.

Where heat shifting is incorporated into both the outdoor air treatment stage and the return air treatment stage, there are potentially two separate ducting system relative humidity set points. Where this occurs, the heat transfer will ideally be regulated to satisfy both the heat shifting to each dehumidification stage, and to their respective relative humidity set points. Where relative humidity in either the treated outdoor air or conditioned space supply air ducting systems is elevated beyond the desired set point for a duration longer than considered acceptable, the conditioned space dry bulb temperature set point and the conditioned space humidity set point (either relative or absolute) may be adjusted to improve the potential to achieve the ducting set points.

In terms of preferred configurations for the pipework for the system of the present invention, the pipework will preferably be configured to incorporate, as mentioned above, the series flow for the dehumidification heat exchanger to the sensible heat exchanger. Both pipework circuits will preferably incorporate a three-way bypass configuration to divert flow from either or both heat exchangers. The circuits will ideally incorporate a flow meter to measure the chilled water flow rate, and will also ideally include temperature sensors to measure the entering, inter stage and leaving chilled water temperature.

The heat reclaim pipework circuit will preferably also incorporate the heat transfer pump to shift energy from the pre-cooling heat exchanger to the heat reclaim heat exchanger, and ideally a flow meter to measure the water flow rate. This circuit will ideally include temperature sensors to measure the entering and leaving temperatures.

Furthermore, the heating resource water pipework circuit will preferably also incorporate a two-way control valve to regulate the heating capacity, as well as a flow sensor and temperature sensors to measure the entering and leaving temperatures.

The present invention also provides a method of controlling the air conditioning system. The control method preferably includes the use of various inputs, including:
  conditioned space dry bulb and relative humidity inputs;
  treated outdoor air dry bulb and relative humidity inputs;
  treated supply air dry bulb and relative humidity inputs; and
  heat exchange medium mass flow input.

The control method also preferably includes the use of various strategies, including:
  an outdoor air dehumidification strategy;
  a return air sensible cooling strategy;
  a heat shifting strategy;
  a treated outdoor air ducting relative humidity strategy;
  a conditioned space supply air ducting relative humidity strategy; and
  a heat exchange medium delivery temperature reset strategy.

In terms of these strategies, in a very general sense they can be summarized as follows:
  the outdoor air dehumidification strategy preferably incorporates demand motivated control over an outdoor air dehumidification heat exchanger and a heat exchange medium (chilled water) control valve;
  The return air sensible cooling strategy preferably incorporates demand motivated control over a return air sensible cooling heat exchanger and the chilled water control valve;
  the heat shifting strategy preferably incorporates demand motivated control over an outdoor air pre-cooling heat exchanger, a heat reclaim heat exchanger and a closed circuit recirculating pump (this strategy could also be applied to a return air pre-cooling heat exchanger, a heat reclaim heat exchanger and a closed circuit recirculating pump); and
  the heat exchange medium delivery temperature reset strategy preferably incorporates demand motivated control over a heat exchange medium (chilled water) delivery temperature reset.

In terms of a preferred control methodology, twin heat exchanger air conditioning such as that utilised by the system of the present invention preferably employs one heat exchanger (such as a chilled water heat exchanger) in the outdoor air stream to provide latent cooling to achieve upper limit humidity control, and a second heat exchanger (such as a second chilled water heat exchanger) in the return air stream to provide additional sensible cooling to satisfy conditioned space dry bulb conditions. The latent cooling (dehumidification) process incorporates heat shifting to transfer sensible cooling associated with dehumidifying process to commence dehumidification without the direct use of the primary cooling medium. Sensible heat shifting within the dehumidification sensible heat transfer thus employs two heat exchangers partnered to the outdoor air dehumidification heat exchanger to regulate the amount of sensible cooling provided as part of the dehumidification process. Sensible cooling that is required to depress the outdoor air stream to achieve dehumidification is preferably reclaimed (shifted) by an additional heat exchanger and a circulating pump in a closed circuit and is transferred to a pre-cooling heat exchanger in the outdoor air stream.

In this situation, where outdoor air is required for the conditioned space, the control system will thus employ the controlled items to manage the conditioned space conditions as follows:
  the outdoor air dehumidification heat exchanger provides the required latent cooling;
  the return air heat exchanger provides additional sensible cooling beyond that provided by the dehumidification process;
  when the dehumidification process provides more sensible cooling than the conditioned space requires, and when relative humidity within the ducting mentioned above moves above a desired condition, the heat reclaim system shifts the surplus sensible cooling post dehumidification (saturation separation) to cooling required to initiate the dehumidification process; and when the load conditions determine a condition within either the treated outdoor air and/or the conditioned space supply air ducting with a humidity higher than the desired condition, then the conditioned space dry bulb and humidity set points are adjusted to shift the load ratio of the twin coil heat transfer heat exchangers toward a greater latent cooling demand and a lesser sensible cooling demand.

For all embodiments of the present invention, the control system preferably utilizes Proportional and Integral (P+I) control theory to provide variable outputs for the controlled elements to achieve conditions in the conditioned space close to set point. All items of plant preferably incorporate variable drives and/or three way valves to respond to the varied input signals.

BRIEF DESCRIPTION OF DRAWINGS

Having briefly described the general concepts involved with the present invention, a preferred embodiment of an improved air conditioning system will now be described that is in accordance with the present invention. However, it is to be understood that the following description is not to limit the generality of the above description.

In the drawings.

DETAILED DESCRIPTION OF PREFERRED EMBODIMENT

Figure 1:
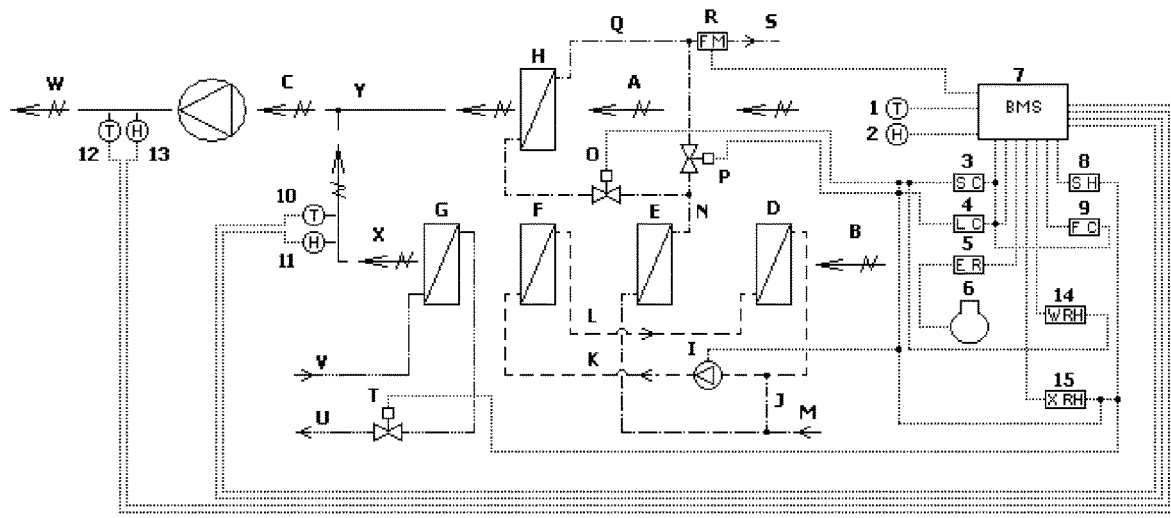
FIG. 1 is a flow diagram of an embodiment of an air conditioning system in accordance with the present invention.
Figure 2:
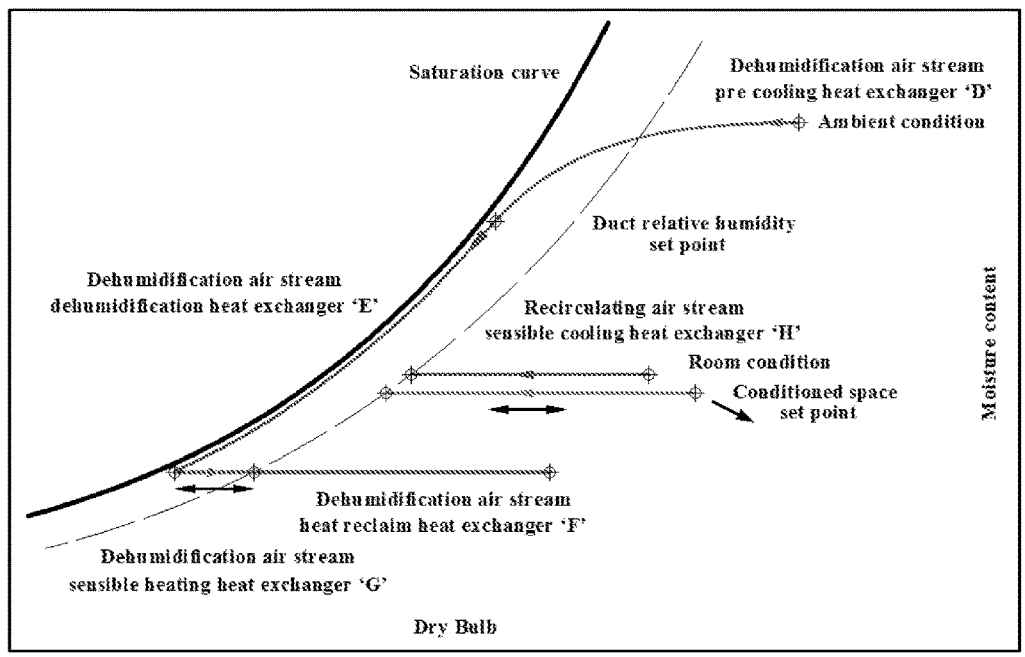
FIG. 2 is the psychrometric chart for the embodiment shown in FIG. 1.

This embodiment is illustrated by the flow diagram of FIG. 1 and the psychrometric chart of FIG. 2. For ease of understanding, the following description will first provide a general overview of the flow diagram of FIG. 1, followed by a more detailed explanation (in a table) of the different elements of the flow diagram. A brief explanation of the psychrometric chart of FIG. 2 will then be provided.

In general terms, shown in the flow diagram of FIG. 1 is an air conditioning system where return air A from the conditioned space is psychometrically treated separately from the outdoor air B (for ventilation) to achieve independent control of sensible and latent cooling. Following this separate treatment of the return air A and the outdoor air B, the two air streams are then mixed to provide a single conditioned space supply air stream W to be delivered to the space to be conditioned.

The cooling process for the return air stream A is principally sensible cooling, which is conducted in the return air sensible cooling treatment stage represented in this embodiment by a heat exchanger H placed in the return air stream A.

The cooling process for the outdoor air stream B is principally latent cooling, which is conducted in the outdoor air latent cooling treatment stage represented in this embodiment by heat exchangers D, E, and F placed in the outdoor air stream B. The first heat exchanger D pre-cools the outdoor air stream B utilizing reclaimed (shifted) energy, reducing the dry bulb temperature of the stream, and commences the dehumidifying process. The second heat exchanger E dehumidifies the outdoor air stream B to an absolute humidity level that will achieve the desired relative humidity level within the conditioned space. The third heat exchanger F reclaims (shifts) sensible heat that is not required to satisfy the conditioned space sensible cooling load.

The result of this third stage of heat exchange is a separation of the outdoor air stream B from the saturation curve. In this respect, the amount of the separation is regulated by a heat transfer pump I connecting the first heat exchanger D to the third heat exchanger F.

Additionally, sensible heating for the conditioned space is provided via a fourth heat exchanger G in the outdoor air B stream downstream of the outdoor air latent cooling treatment stage.

The air conditioning system illustrated in FIG. 1 importantly also includes a treated outdoor air stream dry bulb temperature input device 10 that measures the treated outdoor air stream X dry bulb temperature and provides it as an input to a treated outdoor air stream relative humidity management system 15, together with a treated outdoor air stream relative humidity input device 11 that measures the treated outdoor air stream X relative humidity and provides it as an input also to the treated outdoor air stream relative humidity management system 15. As will be explained below in relation to the psychrometric chart of FIG. 2, this management system 15 separates the treated outdoor air stream dry bulb temperature from the saturation curve to limit relative humidity within the treated outdoor air stream X ducting.

Furthermore, the air conditioning system illustrated in FIG. 1 importantly also includes a conditioned space supply air stream dry bulb temperature input device 12 that measures the conditioned space supply air stream W dry bulb temperature and provides it as an input to a conditioned space supply air stream relative humidity management system 14, together with a conditioned space supply air stream relative humidity input device 13 that measures the conditioned space supply air stream W relative humidity and provides it as an input also to the conditioned space supply air stream relative humidity management system 14. As will be explained below in relation to the psychrometric chart of FIG. 2, this management system 14 separates the conditioned space supply air stream dry bulb temperature from the saturation curve to limit relative humidity within the conditioned space supply air stream W ducting.

The principal heat exchange medium (in this embodiment, chilled water) is used to maximize heat exchanger efficiency. The cold entering flow of chilled water is used to provide the driving potential for the outdoor air second heat exchanger E (which in this embodiment is referred to as a dehumidification heat exchanger), with the subsequently warmed heat exchange medium then passing to the heat exchanger H in the return air A path, which heat exchanger H is referred to as a sensible cooling heat exchanger.

The temperature of the chilled water, before entry to the air conditioning system, is regulated by a demand from the current conditions in the conditioned space. For example, when maximum flow conditions have been provided to the heat exchangers and the conditions in the conditioned space require additional dehumidification or sensible cooling, the initial temperature of the chilled water is scheduled down to achieve additional heat exchange, leading to satisfaction of the conditioned space dry bulb and relative humidity requirements.

Figure 3:
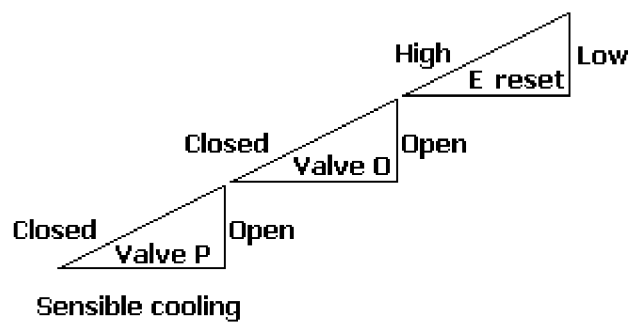
FIGS. 3 to 8 illustrate different operations of the air condition system.

Finally, the sensible cooling heat exchanger control valve O regulates the amount of flow of cool heat exchange medium N that passes through the sensible cooling heat exchanger H. An increase in flow of the cool heat exchange cooling medium increases the amount of heat exchange achieved by the sensible cooling heat exchanger H. As a consequence of cool cooling medium flow, the return air steam A will achieve sensible cooling and, depending on the cooling medium flow temperature and flow rate, latent cooling may also be achieved The following provides a more detailed explanation of the various elements illustrated in the flow diagram of FIG. 1. Element A is a Return air (sensible cooling) stream. Air recirculated from the conditioned space will be typically used to act as the medium to provide sensible cooling to the conditioned space. When heat exchangers H and the series heat exchangers D, E, F and G are configured so as the mixing of air streams is X to A and not X to Y this will be referred to as an air side series configuration. Element B is Outdoor air (dehumidification) stream. Air that is provided for ventilation of the space will be typically used to act as the medium to provide latent cooling to the conditioned space. Element C is Conditioned Space Supply air stream. Air that is supplied to the conditioned space will be cooled to offset the heat load within the conditioned space. The heat load of the space will require a varying ratio and quantum of sensible and latent cooling dependent on the variability of ambient and conditioned space heat in and out flow. Element D is Outdoor air stream pre cooling heat exchanger. The outdoor air stream B passes over the heat exchanger D. A heat reclaim cooling medium (L to K) passes through the heat exchanger D. The direction of flow is counter flow: the warmer airflow is cooled by the warmer cooling medium flow—the cooler airflow is cooled by the cooler medium flow. The outdoor air stream B gives up heat to the heat reclaim cooling medium. The outdoor air steam B will be achieve sensible cooling and, depending on the cooling medium flow temperature, latent cooling may also be achieved. Element E is Outdoor air stream dehumidification heat exchanger. The outdoor air stream B passes over the heat exchanger E. A cooling medium (M to N) passes through the heat exchanger E. The direction of flow is counter flow: the warmer airflow is cooled by the warmer cooling medium flow—the cooler airflow is cooled by the cooler medium flow. The outdoor air stream B gives up heat to the cooling medium. The outdoor air steam B will achieve principally latent cooling, although some sensible cooling will also be achieved. Element F is Outdoor air stream heat reclaim heat exchanger. The outdoor air stream B passes over the heat exchanger F. A heat reclaim heating medium (K to L) passes through the heat exchanger F. The direction of flow is counter flow: the warmer airflow is heated by the warmer heating medium flow—the cooler airflow is heated by the cooler medium flow. The outdoor air stream B takes up heat from the heat reclaim heating medium. The outdoor air steam B will achieve sensible heating—no latent heat exchange will be achieved. Element G is Outdoor air stream sensible heating heat exchanger. The outdoor air stream B passes over the heat exchanger G. A heating medium (V to U) passes through the heat exchanger F. The direction of flow is counter flow: the warmer airflow is heated by the warmer heating medium flow—the cooler airflow is heated by the cooler medium flow. The outdoor air stream B takes up heat from the heating medium. The outdoor air steam B will achieve sensible heating—no latent heat exchange will be achieved. Element H is Return air stream sensible cooling heat exchanger. The return air stream A passes over the heat exchanger H. A cooling medium (N to Q) passes through the heat exchanger H. The direction of flow is counter flow: the warmer airflow is cooled by the warmer cooling medium flow—the cooler airflow is cooled by the cooler medium flow. The return air stream A gives up heat to the cooling medium. The return air steam A will achieve sensible cooling and, depending on the cooling medium flow temperature, latent cooling may also be achieved. Element I is Heat transfer pump. The heat transfer pump I generates flow through the heat reclaim medium piping circuit (K and L) and two heat exchangers (D and F). The sequence of flow through the heat reclaim piping circuit is as follows: flow generated by the heat transfer pump I passes through pipe K, through heat exchanger F, through pipe L, and then through heat exchanger D, returning to the heat transfer pump I. Element J is Feed and expansion pipe. The feed and expansion pipe J connects the heat reclaim piping circuit (K and L) to the cooling medium circuit M. The connection fills the heat reclaim piping circuit with a heat exchange medium from the cooling medium circuit M. The connection permits temperature generated expansion and contraction within the heat reclaim circuit (K and L). Element K is Warm heat reclaim pipe. The warm heat reclaim pipe transfers warm heat reclaim medium from heat exchanger D to heat exchanger F. Element L is Cool heat reclaim pipe. The cool heat reclaim pipe transfers cool heat reclaim medium from heat exchanger F to heat exchanger D. Element M is Cold cooling medium pipe. The cold cooling medium pipe transfers cold cooling medium from the cold generator (a chiller, shown as reference numeral 6, albeit without some piping showing) to the outdoor air stream dehumidification heat exchanger E. Element N is Inter stage cooling medium pipe. The inter stage cooling medium pipe transfers cool cooling medium from the dehumidification heat exchanger E to either the sensible cooling heat exchanger H or the return pipe S to the cold generator (chiller) 6. The inter stage cooling medium pipe is required for series connecting heat exchangers E and H. The inter stage cooling medium pipe is not required for parallel connecting heat exchangers E and H. Element O is Sensible cooling heat exchanger control valve. The sensible cooling heat exchanger control valve O regulates the amount of flow of cool heat exchange medium N that passes through the sensible cooling heat exchanger H. An increase in flow of the cool heat exchange cooling medium increases the amount of heat exchange achieved by the sensible cooling heat exchanger H. As a consequence of cool cooling medium flow, the return air steam A will achieve sensible cooling and, depending on the cooling medium flow temperature and flow rate, latent cooling may also be achieved. Element P is Dehumidification heat exchanger control valve. The dehumidification cooling heat exchanger control valve P regulates the amount of flow of cold heat exchange medium M that passes through the dehumidification heat exchanger E. An increase in flow of the cold heat exchange cooling medium increases the amount of heat exchange achieved by the dehumidification heat exchanger E. As a consequence of cold cooling medium flow, the outdoor air steam B will achieve latent cooling. Sensible cooling will also be achieved at a rate determined by the dehumidification process. Where there is an absence of a dehumidification requirement, and where there is a sensible cooling requirement, the dehumidification cooling heat exchanger control valve P will also be required to regulate the amount of flow of the cold heat exchange medium M. An increase in flow of the cold heat exchange cooling medium increases the amount of heat exchange achieved by the dehumidification heat exchanger E. As a consequence of cold cooling medium flow, the outdoor air stream B will achieve sensible cooling. Depending on the cooling medium flow temperature, latent cooling may also be achieved. When heat exchangers H and E are configured with a parallel water flow configuration this will be referred to as a water side parallel configuration. Element Q is Warm cooling medium pipe. The warm cooling medium pipe Q transfers warm cooling medium from heat exchanger H back to the cold generator (chiller) 6. Element R is Cooling medium flow meter. The cooling medium flow meter R measures the amount of flow in the return cooling medium pipe S. R is not required when heat exchangers H and E are connected as a parallel water flow configuration. Element S is Return cooling medium pipe. The return cooling medium pipe S transfers the mixed return cooling medium back to the cold generator (chiller) 6. Cooling medium that has be utilized in the dehumidification heat exchanger E and the sensible cooling heat exchanger H come together to then return to the cold generator (chiller) 6. Element T is Outdoor air stream sensible heating heat exchanger. The outdoor air stream sensible heating heat exchanger control valve T regulates the amount of flow of hot heat exchange medium V that passes through the sensible heating heat exchanger G. An increase in flow of the hot heat exchange heating medium increases the amount of heat exchange achieved by the sensible heating heat exchanger G. The outdoor air steam B will achieve sensible heating—no latent heat exchange will be achieved. Element U is Warm heating medium pipe. The warm heating medium pipe U transfers warm heating medium from heat exchanger G via a heat generator (not shown) to the hot heating medium pipe V. Element V is Hot heating medium pipe. The hot return heating medium pipe V transfers the hot heating medium from the heat generator to heat exchanger G. Element W is Conditioned space supply air. The conditioned space supply air W is a mixture of the outdoor air stream B (the dehumidification air stream) and the return air stream A (the sensible cooling air stream). The conditioned space supply air stream W transports sensible and latent cooling and sensible heating potential from the series and parallel heat exchangers D, E, F, G and H to offset the conditioned space and outdoor airflow heat load to provide the targeted dry bulb and relative humidity conditions. Element X is Treated outdoor air stream. The treated outdoor air stream X transports sensible and latent cooling, and sensible heating potential, from the series heat exchangers D, E, F and G. Element Y is Treated return air stream. The treated return air stream Y transports sensible (and potentially latent) cooling from heat exchanger H. Element 1 is Conditioned space dry bulb temperature input device. The conditioned space dry bulb temperature input device 1 measures the conditioned space dry bulb temperature as an input to the conditioned space environmental management system 7. Element 2 is Conditioned space relative humidity input device. The conditioned space relative humidity input device 2 measures the conditioned space relative humidity as an input to the conditioned space environmental management system 7. Element 3 is Sensible cooling control algorithm. The sensible cooling control algorithm 3 determines the amount of sensible cooling to be provided from heat exchangers H and E to offset the conditioned space and outdoor air flow sensible cooling requirement. See FIG. 3. In response to the conditioned space dry bulb temperature input device 1, the following control actions in sequence will increase the cooling capacity to maintain the desired conditioned space dry bulb temperature set point:

Modulate the dehumidification cooling heat exchanger control valve P from closed to open.

Modulate the sensible cooling heat exchanger control valve O from closed to open.

Vary the cooling medium reset algorithm 5 from high to low to reset the cold cooling medium generator (chiller) 6 flow temperature from warm to cold.

Figure 4:
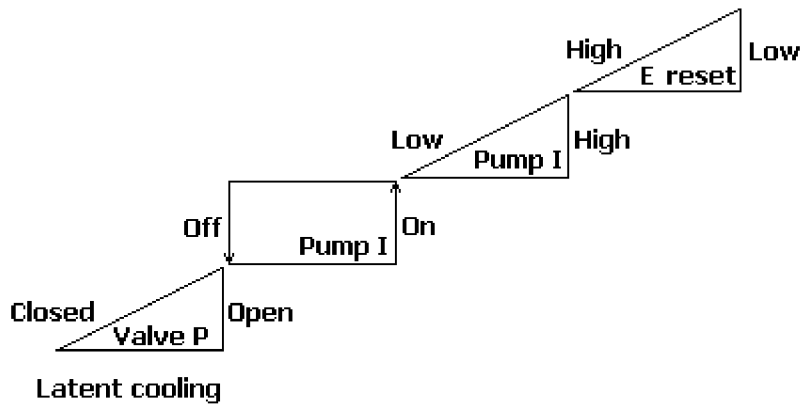

Element 4 is Latent cooling control algorithm. The latent cooling control algorithm 4 determines the amount of latent cooling to be provided from heat exchangers D, E and F to offset the conditioned space and outdoor air flow latent cooling requirement. See FIG. 4. In response to the conditioned space relative humidity input device 2, the following control actions in sequence will increase the dehumidification capacity to maintain the desired conditioned space relative humidity set point:

Modulate the dehumidification cooling heat exchanger control valve P from closed to open.

Energize the heat transfer pump I.

Vary the speed of the heat transfer pump I from low to high.

Vary the cooling medium reset algorithm 5 from high to low to reset the cold cooling medium generator (chiller) 6 flow temperature from warm to cold.

Figure 5:
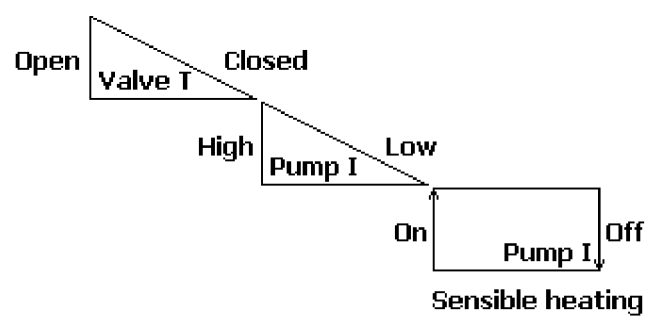

An alternate means of latent cooling capacity delivery can be provided through the substitution of relative humidity management to absolute humidity management. A calculation combining the conditioned space dry bulb temperature sensor 1 and the conditioned space relative humidity sensor 2, or an addition or substitution with a dew point sensor, can change the means of latent cooling management from relative humidity to absolute humidity. Element 5 is Cooling medium reset algorithm. The cooling medium reset algorithm 5 accepts feedback from the conditioned space dry bulb temperature input device 1 and conditioned space relative humidity input device 2 to determine whether the cold cooling medium M is acceptable to achieve the targeted dry bulb and relative humidity conditions. If either the targeted space dry bulb temperature or the conditioned space relative humidity is not achieved, the cold cooling medium generator (chiller) 6 flow temperature is reset. Element 6 is Cold cooling medium generator (chiller). The cold cooling medium generator (chiller) 6 is a mechanical device that removes the heat energy absorbed by heat exchangers E and H. Element 7 is Conditioned space environmental management system. The conditioned space environmental management system 7 is a computer based control system that accepts input from the conditioned space dry bulb temperature input device 1 and the conditioned space relative humidity input device 2 and, through the sensible cooling control algorithm 3 and the latent cooling control algorithm 4, provides output to the sensible cooling heat exchanger control valve O and the dehumidification cooling heat exchanger control valve P to achieve the targeted conditioned space dry bulb temperature and relative humidity. The conditioned space environmental management system 7 also accepts input from the conditioned space dry bulb temperature input device 1 to, through the sensible heating control algorithm 8, provide output to the sensible heating heat exchanger control valve T to achieve the targeted conditioned space dry bulb temperature. The conditioned space environmental management system 7 also accepts input from the outdoor air stream relative humidity input device 11 and the outdoor air stream dry bulb input device 10 to, through the outdoor air stream relative humidity control algorithm 15, achieve the targeted treated outdoor air stream relative humidity. The conditioned space environmental management system 7 also accepts input from the conditioned space supply air stream relative humidity input device 13 and the conditioned space supply air stream dry bulb input device 12 to, through the conditioned space supply air stream relative humidity control algorithm 14, achieve the targeted conditioned space air stream relative humidity. Element 8 is Sensible heating control algorithm. The sensible heating control algorithm 8 determines the amount of sensible heating to be provided from heat exchangers D, F and G to offset the conditioned space and outdoor air flow sensible heating requirement. See FIG. 5. In response to the conditioned space dry bulb temperature input device 1, the following control actions in sequence will increase the heating capacity to maintain the desired conditioned space dry bulb temperature set point:

When the latent cooling control algorithm 4 is active, and
  input from the conditioned space dry bulb temperature input device 1 is below set point,
  energize the heat transfer pump I.
  vary the speed of the heat transfer pump I from low to high.
When the latent cooling control algorithm 4 is not active, and input from the conditioned space dry bulb temperature input device 1 is below set point,
  modulate the outdoor air stream sensible heating heat exchanger control valve T from closed to open.

Figure 6:
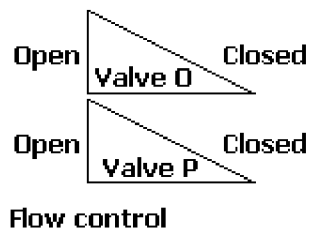

Element 9 is Cold cooling medium flow algorithm. The cold cooling medium flow algorithm 9 limits the flow of the cold cooling medium M and S. Input from the cold cooling medium flow meter R is compared to the determined maximum cold cooling medium flow rate and retards the action of the dehumidification heat exchanger control valve P to limit the flow of cold cooling medium (M to S) to the determined maximum flow rate. See FIG. 6. In response to the cooling medium flow meter R, the following control actions in unison will retard the cooling medium flow to limit flow to the desired cold cooling medium flow rate set point:

Modulate the dehumidification cooling heat exchanger control valve P from open to closed.
Modulate the sensible cooling heat exchanger control valve O from open to closed.

Figure 7:
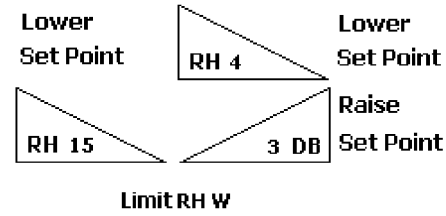

Element 10 is Treated outdoor air stream dry bulb temperature input device. The treated outdoor air stream dry bulb temperature input device 10 measures the treated outdoor air stream X dry bulb temperature as an input to the treated outdoor air stream relative humidity management system 15. Element 11 is Treated outdoor air stream relative humidity input device. The treated outdoor air stream relative humidity input device 11 measures the treated outdoor air stream relative humidity as an input to the treated outdoor air stream relative humidity management system 15. Element 12 is Conditioned space supply air stream dry bulb temperature input device. The conditioned space supply air stream dry bulb temperature input device 12 measures the conditioned space supply air stream W dry bulb temperature as an input to the conditioned space supply air stream relative humidity management system 14. Element 13 is Conditioned space supply air stream relative humidity input device. The conditioned space supply air stream relative humidity input device 13 measures the conditioned space supply air stream relative humidity as an input to the conditioned space air stream relative humidity management system 14. Element 14 is Conditioned space supply air stream relative humidity control algorithm. The conditioned space supply air stream relative humidity control algorithm 14 separates the conditioned space supply air stream dry bulb temperature and moisture content from the saturation curve to limit relative humidity within the conditioned space supply air stream ducting. See FIG. 7. In response to the conditioned space supply air stream relative humidity input device 13, the following control actions in series and parallel will shift the conditioned space supply air stream W to a lower relative humidity condition:

Lower the treated outdoor air stream X relative humidity set point.
Then, simultaneously modulate the conditioned space dry bulb temperature set point from a lower setting to a higher setting and modulate the conditioned space relative humidity set point from a higher setting to a lower setting.

Figure 8:
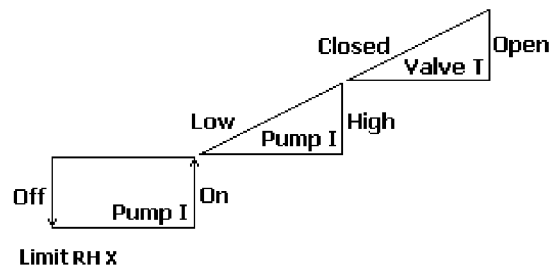

Element 15 is Treated outdoor air stream relative humidity control algorithm. The treated outdoor air stream relative humidity control algorithm 15 separates the treated outdoor air stream dry bulb temperature and moisture content from the saturation curve to limit relative humidity within the treated outdoor air stream ducting. See FIG. 8. In response to the treated outdoor air stream relative humidity input device 11, the following control actions in sequence will increase the sensible heating capacity to maintain the desired treated outdoor air stream relative humidity set point:

Energize the heat transfer pump I.
Vary the speed of the heat transfer pump I from low to high.
Modulate the outdoor air stream sensible heating heat exchanger control valve T from closed to open.

With regard to the chart of FIG. 2, the psychrometric process is as follows: an outdoor air pre-cooling heat exchanger D pre-cools the outdoor air stream B; an outdoor air dehumidification heat exchanger E uses chilled water to dehumidify the outdoor air stream B; and an outdoor air heat reclaim heat exchanger F shifts energy to the outdoor air pre-cooling heat exchanger D to pre-cool. This enables the outdoor air stream B to be adequately dehumidified with a reduced proportion of sensible cooling and as can be seen from FIG. 2, separation from the saturation curve is achieved, with the amount of separation being achieved by the regulation of heat transfer from the outdoor air pre-cooling heat exchanger D to the outdoor air heat reclaim heat exchanger F.

In this respect, where further separation is required to achieve an upper relative humidity limit for the outdoor air stream B, sensible heat transfer is provided by means of an outdoor air sensible heating heat exchanger G. In the situation where sensible cooling of the conditioned space supply air stream W is required, a return air sensible cooling heat exchanger H uses chilled water to provide sensible cooling. In the event that the required sensible cooling reduces the conditioned space supply air stream W dry bulb temperature to an extent where its relative humidity approaches the conditioned space supply air ducting relative humidity set point, the conditioned space dry bulb and relative humidity control set points are adjusted to simulate an alternate comfort sensation.

By way of summary with regard to the embodiment of FIGS. 1 and 2, and as mentioned above, the psychrometric solution is achieved using separate air paths. As the Shaw system used the outdoor air stream to dehumidify prior to mixing, the preferred embodiment of the present invention uses this same Shaw methodology but extended to five heat transfer processes. With this in mind, and as will be understood from the above description, utilising heat reclaim permits variability in the dehumidification process to provide separation from the saturation curve that can be regulated to both satisfy the conditions of the conditioned space and satisfy relative humidity upper limits for the conditioned space supply air ducting and the treated outdoor air ducting, with minimal or eliminated need for reheat, and where conditioned space load conditions demand additional sensible cooling an alternate comfort scenario is scheduled to reduce the potential for high ducting relative humidity within the conditioned space supply air stream.

It can also be considered that where there are higher than normal dehumidification requirements for the outdoor air stream heat exchangers in combination with the cooling medium reset strategy to achieve a desired conditioned space humidity set point, and where latent cooling is required from the recirculating air stream sensible cooling heat exchanger, then a heat shifting process similar to that provided to the outdoor air stream may be provided by the system of the present invention in preference to, or also adjusting, the comfort condition scenario shift to achieve a desired conditioned space supply air ducting relative humidity upper limit set point. In this scenario, where heat shifting is required for both the outdoor air stream and the return air stream, and there is a minimal outdoor air stream ducting, then it would also be possible for just a single heat reclaim heat exchanger to be fitted to the conditioned space supply air stream to shift pre-cooling potential to only the outdoor air stream.

In conclusion, it must be appreciated that there may be other variations and modifications to the configurations described herein which are also within the scope of the present invention.

What is claimed is:

1. An air conditioning system operable to treat a conditioned space by treating outdoor air from outside the conditioned space and return air from inside the conditioned space, and mixing the treated outdoor air with the treated return air to form supply air for the conditioned space, the air conditioning system comprising:
    an outdoor air latent cooling treatment stage operable to provide parallel airflow with a return air sensible cooling treatment stage;
    a mixer to mix the treated outdoor air with the treated return air to form the conditioned space supply air;
    a first relative humidity controller operable to monitor the treated outdoor air relative humidity and separate the treated outdoor air from saturation to maintain relative humidity in treated outdoor air ducting below a predetermined mould growth limit; and
    a second relative humidity controller operable to monitor the conditioned space supply air relative humidity and separate the conditioned space supply air from saturation to maintain relative humidity in conditioned space supply air ducting below a predetermined mould growth limit;
    wherein the outdoor air latent cooling treatment stage includes at least a dehumidification heat exchanger, combination pre-cooling and heat reclaim heat exchangers, and a heat transfer pump, and
    wherein the return air sensible cooling treatment stage includes at least a sensible cooling heat exchanger.

2. The air conditioning system according to claim 1, wherein energy required for dehumidification in the outdoor air latent cooling treatment stage also sensibly cools the outdoor air stream, by the use of a closed heat reclaim loop to pre-cool the outdoor air stream using a chilled water system and shift the energy to the heat reclaim heat exchanger with the heat transfer pump.

3. The air conditioning system according to claim 2, wherein the amount of energy shifted to the heat reclaim heat exchanger is determined by either the conditioned space sensible heat load requirement or the relative humidity limits of the treated outdoor air.

4. The air conditioning system according to claim 3, wherein when the energy shifted is insufficient to achieve either the conditioned space sensible heat load requirement or the relative humidity limit of the treated outdoor air, an additional sensible heating heat exchanger is incorporated in the outdoor air latent cooling treatment stage.

5. The air conditioning system according to claim 1, wherein the first relative humidity controller monitors the treated outdoor air relative humidity by way of an outdoor air stream relative humidity input device that measures the outdoor air stream relative humidity and provides it as an input to an outdoor air stream relative humidity management system, the outdoor air stream relative humidity management system being operable to separate the outdoor air stream dry bulb temperature from a saturation curve to limit relative humidity within the outdoor air stream ducting.

6. The air conditioning system according to claim 5, wherein separation from the saturation curve is provided by increasing the dry bulb temperature of the outdoor air stream and thereby decreasing the relative humidity of the dehumidified condition of the outdoor air stream.

7. The air conditioning system according to claim 1, wherein the second relative humidity controller monitors the conditioned space supply air relative humidity by way of a conditioned space supply air stream relative humidity input device that measures the conditioned space supply air stream relative humidity and provides it as an input to a conditioned space supply air stream relative humidity management system, the conditioned space supply air stream relative humidity management system being operable to separate the conditioned space supply air stream dry bulb temperature from a saturation curve to limit relative humidity within the conditioned space supply air stream ducting.

8. The air conditioning system according to claim 7, wherein separation from the saturation curve is provided by increasing mass flow within either or both the outdoor air pre-cooling and heat reclaim heat exchangers heat transfer circuit.

9. The air conditioning system according to claim 7, wherein separation from the saturation curve is provided by increasing mass flow within either or both the outdoor air pre-cooling and heat reclaim heat exchangers heat transfer circuit, and by altering conditioned space set points, either dry bulb or relative humidity or both.

* * * * *